United States Patent
Nakagawa

[11] 3,851,953
[45] Dec. 3, 1974

[54] PHOTOGRAPHIC LENS SYSTEM HAVING SHORT OVERALL LENGTH AND LARGE APERTURE RATIO

[75] Inventor: Jihei Nakagawa, Tokyo, Japan

[73] Assignee: Olympus Optical Company Limited, Tokyo, Japan

[22] Filed: May 2, 1973

[21] Appl. No.: 356,599

[30] Foreign Application Priority Data
May 4, 1972 Japan.............................. 47-44325

[52] U.S. Cl.............................. 350/215, 350/176
[51] Int. Cl................................................ G02b 9/62
[58] Field of Search......................... 350/176, 215

[56] References Cited
UNITED STATES PATENTS
3,738,736   6/1973   Shimizu .............................. 350/215

*Primary Examiner*—John K. Corbin
*Attorney, Agent, or Firm*—Eric H. Waters

[57] ABSTRACT

A modified Gaussian type photographic lens system having a short overall length and a large aperture ratio, which is constructed as 6 components and 7 lenses and consists of a first component of a positive meniscus lens that has its object side a convex surface, a second component of a positive meniscus lens that has its object side a convex surface, a third component of a negative meniscus lens that has its object side a convex surface, a fourth component of a negative meniscus doublet that has its image side a convex surface, a fifth component of a positive meniscus lens that has its image side a convex surface, and a sixth component of a positive lens.

1 Claim, 4 Drawing Figures

PATENTED DEC 3 1974 3,851,953
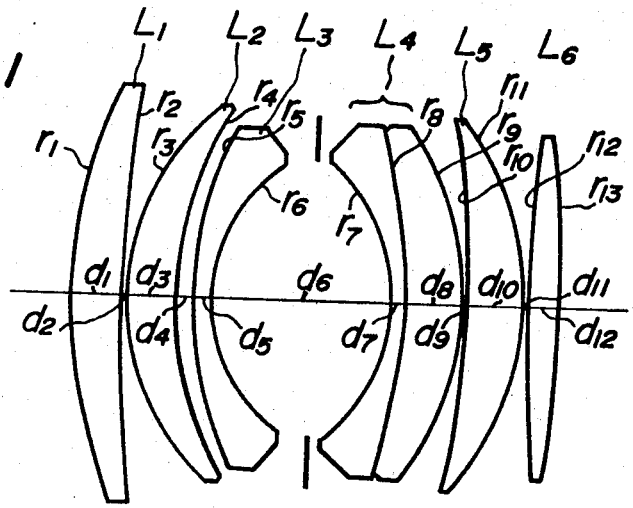
FIG_1
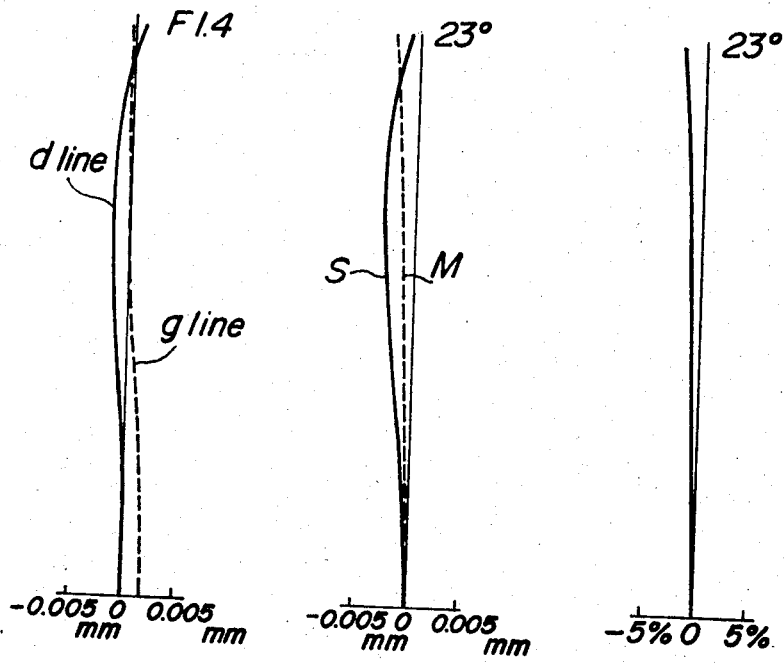
FIG_2a   FIG_2b   FIG_2c

PHOTOGRAPHIC LENS SYSTEM HAVING SHORT OVERALL LENGTH AND LARGE APERTURE RATIO

This invention relates to a modified Gaussian type photographic lens system which is constructed as 6 components and 7 lenses and consists of a first component of a positive meniscus lens that has its object side a convex surface, a second component of a positive meniscus lens that has its object side a convex surface, a third component of a negative meniscus lens that has its object side a convex surface, a fourth component of a negative meniscus doublet that has its image side a convex surface, a fifth component of a positive meniscus lens that has its image side a convex surface, and a sixth component of a positive lens, and which has an aperture ratio of 1:1.4, a picture angle of 46°, and a back focal length which is sufficient to use the lens system for single-lens reflex cameras, and which can significantly correct various aberrations and yet has a very short overall length.

The overall thickness of a lens system is important in case of correcting various aberrations. It has been well known that sufficient correction of aberrations could not be attained for a lens system having a large aperture ratio unless its overall length is made longer correspondingly.

An object of the invention is to provide a lens system which can significantly correct vairous aberrations and yet has the shortest possible overall length.

For a better understanding of the invention, the same will be explained by reference to the accompanying drawings, in which:

FIG. 1 shows in cross-section a lens system constructed according to the invention; and FIGS. 2a to 2c show aberration characteristic curves of one embodiment of the invention.

Referring to the drawings, a lens system according to the invention is shown in FIG. 1 in which $L_1$ designates a first component of a positive meniscus lens that has its object side a convex surface, $L_2$ shows a second component of a positive meniscus lens that has its object side a convex surface, $L_3$ illustrates a third component of a negative meniscus lens that has its object side a convex surface, $L_4$ designates a fourth component of a negative meniscus doublet that has its image side a convex surface, a diaphragm being located between the lenses $L_3$ and $L_4$, $L_5$ shows a fifth component of a positive meniscus lens that has its image side a convex surface, and $L_6$ illustrates a sixth component of a positive lens.

These lenses $L_1$ to $L_6$ have radii of curvatures $r_1$ to $r_{13}$ and thicknesses and air spaces $d_1$ to $d_{12}$ whose numerical values, based upon a numerical value of 1.0 for the overall focal length, along with the refractive indices $n$ and the Abbe's numbers $\nu$ thereof are given in the following table:

| Lens | Radii r | Air spaces and thicknesses | n | $\nu$ |
|---|---|---|---|---|
| $L_1$ | $r_1$=0.78185 | | | |
| | | $d_1$=0.08861 | 1.8348 | 42.8 |
| | $r_2$=2.59845 | | | |
| | | $d_2$=0.00232 | 1 | |
| $L_2$ | $r_3$=0.42498 | | | |
| | | $d_3$=0.08784 | 1.8061 | 40.8 |
| | $r_4$=0.60180 | | | |
| | | $d_4$=0.03436 | 1 | |
| $L_3$ | $r_5$=0.69415 | | | |
| | | $d_5$=0.02606 | 1.7847 | 26.22 |
| | $r_6$=0.28654 | | | |
| | | $d_6$=0.30888 | 1.0 | |
| | $r_7$=−0.31581 | | | |
| $L_4$ | $r_8$=−0.99807 | $d_7$=0.02645 | 1.7847 | 25.7 |
| | | $d_8$=0.09981 | 1.8061 | 40.8 |
| | $r_9$=−0.52703 | | | |
| | | $d_9$=0.00193 | 1 | |
| $L_5$ | $r_{10}$=−1.50994 | | | |
| | | $d_{10}$=0.09691 | 1.713 | 54.0 |
| | $r_{11}$=−0.50290 | | | |
| | | $d_{11}$=0.00232 | 1 | |
| $L_6$ | $r_{12}$=3.38224 | | | |
| | | $d_{12}$=0.05174 | 1.713 | 54.0 |
| | $r_{13}$=−1.86805 | | | |
| | | | 1 | |

Overall focal length $f$=1.0
Back focal length $f_B$=0.741
Overall length L=0.82723

In accordance with the invention, the various aberrations degraded by shortening the overall length of the lens system are corrected by making the refractive index of each lens component high and the radius of curvature of each lens component relatively small. In addition, the cemented surface of the fourth component of meniscus doublet $L_4$ turns its concavity forwardly, i.e., toward the image side of the system, and as a result, the thickness of the lens can be made thin. Moreover, the cemented surface of the fourth component of meniscus doublet $L_4$ and the front surface of the fifth component of positive meniscus lens $L_5$ are constructed as aplanatic so as to effectively correct the various aberrations.

Various aberration characteristic curves of the present embodiment are shown in FIGS. 2a to 2c. FIG. 2a shows the spherical aberrations. FIG. 2b the astigmatisms, and FIG. 2c the distortion.

As seen from these aberration characteristic curves, the lens system according to the present embodiment makes it possible to significantly correct various aberrations.

For purposes of reference, the secondary aberrations coefficients of the lens system according to the invention are given in the following table:

| | Spherical aberration coefficient B | Coma coefficient F | Astigmatism coefficient C | Curvature coefficient P | Distortion coefficient E |
|---|---|---|---|---|---|
| 1 | 0.5188 | 0.0277 | 0.1199 | 0.5819 | 0.1409 |
| 2 | 0.0670 | 0.6643 | −0.2110 | −0.1751 | −1.5403 |
| 3 | 0.0434 | 0.0022 | 0.0097 | 1.0502 | 0.2357 |
| 4 | 0.0046 | 0.8725 | −0.0632 | −0.7416 | −1.8058 |
| 5 | −0.0667 | −1.1401 | 0.2757 | 0.6334 | 2.0954 |
| 6 | −1.6039 | −0.0943 | −0.3890 | −1.5344 | −0.3950 |
| 7 | −2.5189 | −0.3406 | 0.9263 | −1.3923 | 0.6372 |
| 8 | 0.0000 | 0.0082 | 0.0006 | −0.0066 | 0.0226 |
| 9 | 0.2364 | 0.1091 | −0.1606 | 0.8469 | −0.6496 |
| 10 | 0.0000 | 0.0006 | −0.0002 | −0.2757 | 1.1004 |
| 11 | 2.4217 | 0.0161 | −0.1976 | 0.8277 | −0.0688 |
| 12 | −0.0261 | −0.3029 | 0.0888 | 0.1231 | 0.6130 |
| 13 | 1.0922 | 0.1413 | −0.3929 | 0.2228 | −0.1310 |
| Σ | 0.1687 | −0.0359 | 0.0065 | 0.1602 | 0.2547 |

The overall length of conventional photographic lens systems whose back focal length, aperture ratio and picture angle are substantially the same as those of the photographic lens system according to the invention is $L$=1.01 designed to operate with, for example, $f$=1.0, $f_B$=0.75, F/1.4 and $2\omega$=46° and is $L$=0.9921 designed to operate with, for example, $f$=1.0, $f_B$=0.7442, F/1.4 and $2\omega=46°$. That is, the overall lengths of these conventional photographic lens systems are substantially of the order of about 1f. On the contrary, the overall length of the photographic lens system according to the invention is $L=0.82723$ designed to operate with $f=1.0$, $f_B=0.741$, F/1.4 and $2\omega=46°$. Thus, the overall length of the photographic lens system according to the invention is very short if compared with those of conventional photographic lens systems and hence has significantly large amounts of peripheral light rays.

What is claimed is:

1. A photographic lens system having a short overall length and a large aperture ratio, which is constructed as six components and seven lenses and consists of a first component of a positive meniscus lens that has its object side a convex surface, a second component of a positive meniscus lens that has its object side a convex surface, a third component of a negative meniscus lens that has its object side a convex surface, a fourth component of a negative meniscus doublet that has its image side a convex surface, a fifth component of a positive meniscus lens that has its image side a convex surface, and a sixth component of a positive lens, and in which radii of curvature of the lens surfaces $r$, air spaces and axial thicknesses of the lenses $d$, refractive indices $n$ and Abbe's numbers, all counted from the object side are given in the following table:

| Lens | Radii $r$ | Air spaces and thicknesses | $n$ | $\nu$ |
|---|---|---|---|---|
| | | | 1 | |
| $L_1$ | $r_1=0.78185$ | | | |
| | | $d_1=0.08861$ | 1.8348 | 42.8 |
| | $r_2=2.59845$ | | | |
| | | $d_2=0.00232$ | 1 | |
| | $r_3=0.42498$ | | | |
| $L_2$ | | $d_3=0.08784$ | 1.8061 | 40.8 |
| | $r_4=0.60180$ | | | |
| | | $d_4=0.03436$ | 1 | |
| | $r_5=0.69415$ | | | |
| $L_3$ | | $d_5=0.02606$ | 1.7847 | 26.22 |
| | $r_6=0.28654$ | | | |
| | | $d_6=0.30888$ | 1 | |
| | $r_7=-0.31581$ | | | |
| $L_4$ | | $d_7=0.02645$ | 1.7847 | 25.7 |
| | $r_8=-0.99807$ | | | |
| | | $d_8=0.09981$ | 1.8061 | 40.8 |
| | $r_9=-0.52703$ | | | |
| | | $d_9=0.00193$ | 1 | |
| | $r_{10}=-1.50994$ | | | |
| $L_5$ | | $d_{10}=0.09691$ | 1.713 | 54.0 |
| | $r_{11}=-0.50290$ | | | |
| | | $d_{11}=0.00232$ | 1 | |
| | $r_{12}=3.38224$ | | | |
| $L_6$ | | $d_{12}=0.05174$ | 1.713 | 54.0 |
| | $r_{13}=-1.86805$ | | | |
| | | | 1 | |

Overall focal length $f=1.0$
Backfocal length $f_B=0.741$ and
Overall length $L=0.82723$

* * * * *